Figure 1:
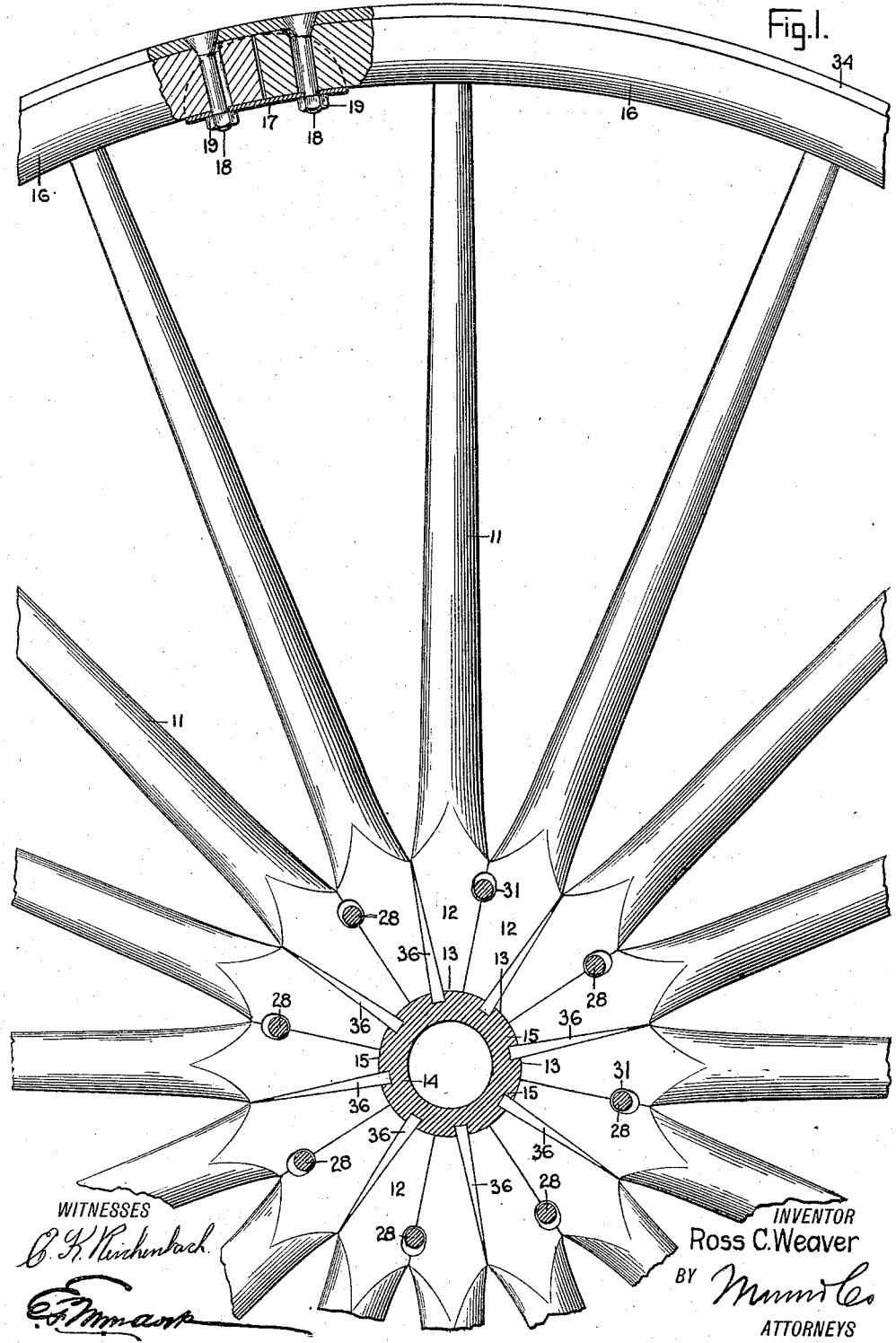

R. C. WEAVER.
VEHICLE WHEEL.
APPLICATION FILED FEB. 6, 1915.

1,183,611.

Patented May 16, 1916.
2 SHEETS—SHEET 1.

WITNESSES

INVENTOR
Ross C. Weaver
BY
ATTORNEYS

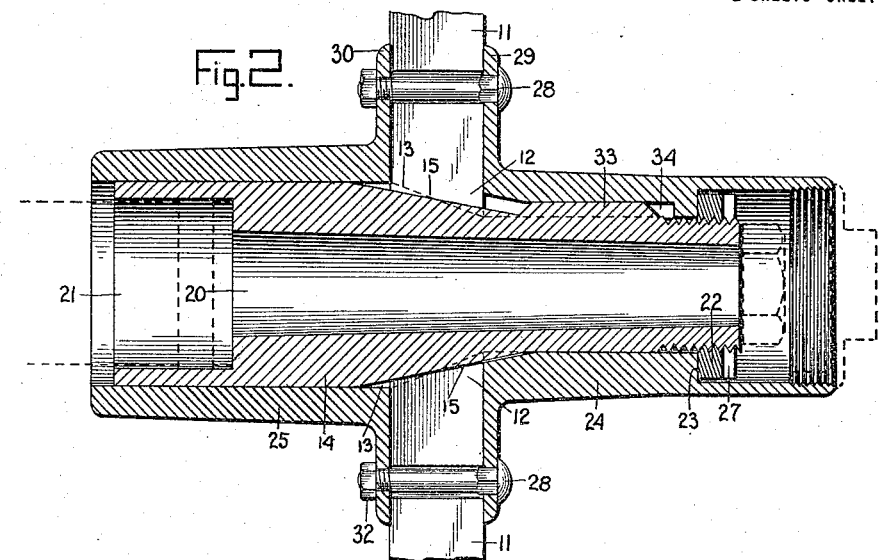
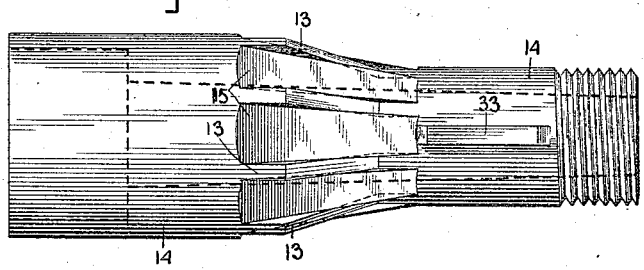
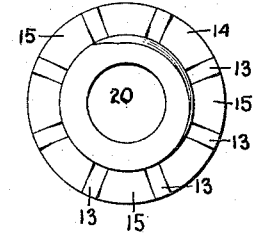
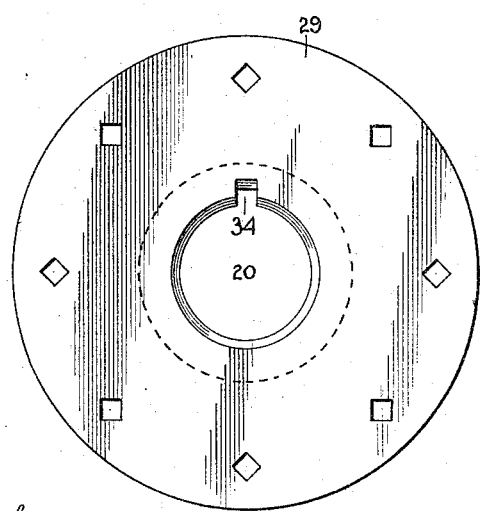
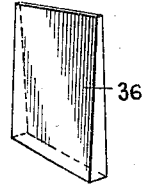

UNITED STATES PATENT OFFICE.

ROSS CARLETON WEAVER, OF TARRYTOWN, NEW YORK.

VEHICLE-WHEEL.

1,183,611.      Specification of Letters Patent.      Patented May 16, 1916.

Application filed February 6, 1915. Serial No. 6,495.

*To all whom it may concern:*

Be it known that I, ROSS C. WEAVER, a citizen of the United States, and a resident of Tarrytown, in the county of Westchester and State of New York, have invented a new and Improved Vehicle-Wheel, of which the following is a full, clear, and exact description.

Among the principal objects which the present invention has in view are the following: To provide means for compensating for the usual service wear on wheels of the character mentioned; to provide means for contracting and expanding the wheel felly to accommodate the wheel tire; to provide means for preventing twisting of spokes in the wheel structure; to provide means for preventing rattling of the spokes and securing relative uniformity in the movement thereof; and to simplify the construction of wheels of the character mentioned and to reduce the cost thereof.

*Drawings.*—Figure 1 is a side view of a fragment of a wheel, constructed and arranged in accordance with the present invention; Fig. 2 is a detail view on an enlarged scale, showing a longitudinal section of the hub of a wheel when constructed and arranged in accordance with the present invention; Fig. 3 is a detail view of an axle journal bushing, with which wheels constructed in accordance with the present invention are provided; Fig. 4 is an end view of the same; and Fig. 5 is a detail view, showing the inner face of the exterior hub flange and barrel; Fig. 6 is a detail view of a spacing wedge for the spokes of the wheels.

*Description.*—As seen in the drawings, wheels when constructed and arranged in accordance with the present invention are provided with a series of spokes 11. At the hub end, each spoke is provided with a wedge section 12. To form seats for the spokes 11, and for the beveled ends thereof, inclined grooves 15 are formed in a bushing 14. Intermediate the grooves 15 are inclined spacing wedges 13. These wedges are provided with inclined surfaces set at a sharper angle than the grooves 15 for reasons hereinafter more fully set forth. The outer ends of the spokes 11 are connected in conventional manner with felly sections 16. The felly sections 16 are mutually joined by cover plates 17, shaped to cover the adjacent ends of the said sections and to guide the same in the movement imparted thereto when the spokes are expanded and contracted. The plates 17 are held in service by bolts 18, said bolts having conventional heads and being tightened by nuts 19, as shown best in Fig. 1 of the drawings. It will be understood that the number of sections 16 employed in the construction of the wheel, will vary to suit the opinion of the designer. The bushing 14 has a central journal opening 20 into which the journal of a vehicle axle is disposed in service. An end chamber 21 is provided as in conventional structures to receive the thrust collar, with which axles of the description mentioned are usually provided. The outer end of the bushing 14 is diametrically reduced and is provided at the extreme thereof with a screw thread section, the threads whereof engage those of a follower nut 22. The nut 22 in service bears against the shoulder 23, with which the exterior hub section 24 is provided. The hub section 24 is bored to fit the reduced end of the bushing 14, while the inner hub section 25 is bored to fit the barrel or body of the bushing 14. Intermediate the body of the bushing 14 and the reduced section 21 thereof, is a coned section wherein are formed the ridges 13 and grooves 15 above noted, the office whereof is to support the spokes 11. The nut 22 is provided with spanner grooves 27, which are employed when the nut is manipulated to force the same against the shoulder 23 of the section 24, to draw the bushing 14 outward through the section 24 and to wedge between the ends of the spokes 11, the inclined ridges 13 and grooves 15 respectively, thereby radially extending the said spokes.

The sections 24 and 25 are structurally united by bolts 28. The bolts 28 are extended through perforations provided in the flanges 29 and 30 of the sections 24 and 25 respectively. The spokes 11 are provided on one side of the sections 12 thereof, with elongated transverse grooves 31, within which grooves the bolts 28 rest in service. It is obvious that when the nuts 32 are set up against the flange 30, the flanges 29 and 30 are drawn tightly against the sides of the sections 12 of the spokes 11. To prevent the bushing 14 from turning in the hub sections 24 and 25, the bushing is provided with a feather or key 33. To receive the feather 33, the section 24 is routed to form the keyway 34, as shown in Fig. 5 of the drawings.

With a wheel constructed and arranged in accordance with the above description, any wear which may affect the spokes 11, is easily compensated for or taken up by manipulating the nut 22 to thrust the sections 24 and 25 backward on the bushing 14, to slide the inclined ends of the spokes 11 up the inclined surfaces of the grooves 15 on which the said spokes rest. The effect of this action is to radially move said spokes and to expand the felly sections 16 connected therewith. The radial expansion to which the felly sections 16 are thus subject, has the immediate effect of separating the adjacent ends of said felly sections. It will also be seen that with a wheel so constructed when it becomes desirable to remove the tire 35, this may be accomplished by retracting the nut 22 to move the section 24 outward; the inner ends of the spokes being thereby displaced from the inclined surfaces of the ridges 13 and grooves 15. This permits the felly sections 16 and spokes connected therewith, to be relatively contracted or moved toward the center of the wheel. The tire 35, may now be easily removed. When the new or repaired tire has been replaced to circumfold the felly sections 16, the said sections may be expanded to engage said tire by reversing the above-mentioned action of the nut 22 and sections 24 and 25, with the result that the spokes 11 and sections 16 will be expanded to firmly engage the said tire.

To take up any wear on or between the spokes 11, the wedges 36 are placed between each pair and shaped to rest on the ridges 13. The relatively increased inclination of the said ridges insures a relatively augmented movement of the wedges 36, and in this manner are moved to compensate for the abrasive wear between the sides of the spokes 11.

Claims:

1. A vehicle wheel comprising a plurality of hub sections, said sections having bores of relatively different diameters; a bushing having end sections to fit said bores; and a middle tapered section interposed between said end sections; a plurality of spokes, the butts of each being inclined in correspondence with said middle section; a plurality of wedges having butts inclined in correspondence with said middle section; and means for drawing said hub sections toward each other for forcing said spokes and said wedges upward on the taper section of said bushing.

2. A vehicle wheel comprising a plurality of hub sections, said sections having bores of relatively different diameters; a bushing having end sections to fit said bores, and a middle tapered section interposed between said end sections; a plurality of spokes, the butts of each being inclined in correspondence with said middle section; a plurality of wedges having butts inclined in correspondence with said middle section; and a plurality of bolts operatively engaging said hub sections to draw the same together.

In testimony whereof I have signed my name to this specification in the presence of two subscribing witnesses.

ROSS CARLETON WEAVER.

Witnesses:
HENRY BURKE,
SUSIE DOWLING.

Copies of this patent may be obtained for five cents each, by addressing the "Commissioner of Patents, Washington, D. C."